US010332232B2

(12) United States Patent
Gould et al.

(10) Patent No.: US 10,332,232 B2
(45) Date of Patent: *Jun. 25, 2019

(54) THREAD DISPATCHING FOR GRAPHICS PROCESSORS

(71) Applicant: INTEL CORPORATION, Santa Clara, CA (US)

(72) Inventors: Julia A. Gould, San Jose, CA (US); Haihua Wu, San Jose, CA (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/817,978

(22) Filed: Nov. 20, 2017

(65) Prior Publication Data
US 2018/0300843 A1 Oct. 18, 2018

Related U.S. Application Data

(63) Continuation of application No. 14/565,240, filed on Dec. 9, 2014, now Pat. No. 9,824,414.

(51) Int. Cl.
G06T 1/20 (2006.01)
G06F 9/48 (2006.01)
(Continued)

(52) U.S. Cl.
CPC ............ *G06T 1/20* (2013.01); *G06F 9/3009* (2013.01); *G06F 9/3851* (2013.01); *G06F 9/4881* (2013.01); *H04N 19/70* (2014.11)

(58) Field of Classification Search
CPC .......... G06T 1/20; G06T 1/60; G06T 15/005; G06T 2200/28; G06T 2210/52; G06F 9/30145; G06F 9/4481; G06F 9/3851; G06F 17/30327; G06F 17/30563; G06F 17/30961; G06F 9/3887; G06F 9/3802; G06F 9/45533; G06F 9/5038; G06F 1/3287; G06F 9/3009; G06F 9/4893; G06F 9/5077; G06F 9/522; G06F 11/0715; G06F 11/0724; G06F 11/0757; G06F 11/2242; G06F 11/263; G06F 11/3017; G06F 11/3024; G06F 11/3423; G06F 11/3466; G06F 11/3471;
(Continued)

(56) References Cited

U.S. PATENT DOCUMENTS 8,374,242 B1 2/2013 Lewis et al.
2003/0172258 A1 9/2003 Krishnan
(Continued)

OTHER PUBLICATIONS

Meenderinck, Cor, et al. "Parallel scalability of video decoders." Journal of Signal Processing Systems 57.2 (2009): 173-194.*
(Continued)

*Primary Examiner* — Sultana M Zalalee

(57) ABSTRACT

Techniques to dispatch threads of a graphics kernel for execution to increase the interval between dependent threads and the associated are disclosed. The dispatch interval may be increased by dispatching associated threads, followed by threads without any dependencies, followed by threads dependent on the earlier dispatched associated threads. As such, the interval between dependent threads and their associated threads can be increased, leading to increased parallelism.

19 Claims, 15 Drawing Sheets

(51) Int. Cl.
  *G06F 9/30* (2018.01)
  *H04N 19/70* (2014.01)
  *G06F 9/38* (2018.01)

(58) Field of Classification Search
  CPC .... G06F 11/348; G06F 12/00; G06F 12/0253;
         G06F 12/0813; G06F 9/30032; G06F
         9/30036; G06F 9/30054; G06F 9/30098;
         G06F 9/3013; G06F 9/30149; G06F
         9/30181; G06F 9/321; G06F 9/3814;
         G06F 9/3824; G06F 9/3844; G06F
         9/3853; G06F 9/3861; G06F 9/3867;
         G06F 9/3879; G06F 9/3895; G06F
         9/4411; G06F 9/44
  See application file for complete search history.

(56) References Cited

U.S. PATENT DOCUMENTS

| | | | | |
|---|---|---|---|---|
| 2006/0179281 | A1* | 8/2006 | Jensen | G06F 9/3836 712/214 |
| 2009/0164996 | A1 | 6/2009 | Baeuerle et al. | |
| 2009/0327662 | A1* | 12/2009 | Jiang | G06F 9/3838 712/217 |
| 2013/0290639 | A1* | 10/2013 | Tran | G06F 9/30032 711/125 |
| 2013/0325378 | A1* | 12/2013 | Allen-Ware | G06F 1/329 702/61 |
| 2014/0267439 | A1* | 9/2014 | Jenkins | H02M 3/157 345/668 |
| 2014/0354644 | A1 | 12/2014 | Nystad | |
| 2014/0359632 | A1* | 12/2014 | Kishan | G06F 9/5038 718/103 |
| 2015/0160970 | A1* | 6/2015 | Nugteren | G06F 8/451 718/102 |
| 2015/0172412 | A1* | 6/2015 | Escriva | G06F 9/466 709/202 |
| 2015/0334386 | A1* | 11/2015 | Brice | H04N 17/004 348/180 |
| 2016/0188441 | A1* | 6/2016 | Chen | G06F 11/3672 717/127 |

OTHER PUBLICATIONS

Bossen, Frank, et al. "HEVC complexity and implementation analysis." IEEE Transactions on Circuits and Systems for Video Technology 22.12 (2012): 1685-1696.*

Shen, Weiwei, et al. "A high-throughput VLSI architecture for deblocking filter in HEVC." 2013 IEEE International Symposium on Circuits and Systems (ISCAS2013). IEEE, May 19-23, 2013.*

Extended European Search Report for European Patent Application No. 15868374, dated May 28, 2018, 2 pages.

Author unknown, "Southern Islands Series Instruction Set Architecture," (Reference guide—AMD Accelerated Parallel Processing Technology v1.4) [online] Advanced Micro Devices, Inc., 248 pages (Feb. 2014).

* cited by examiner

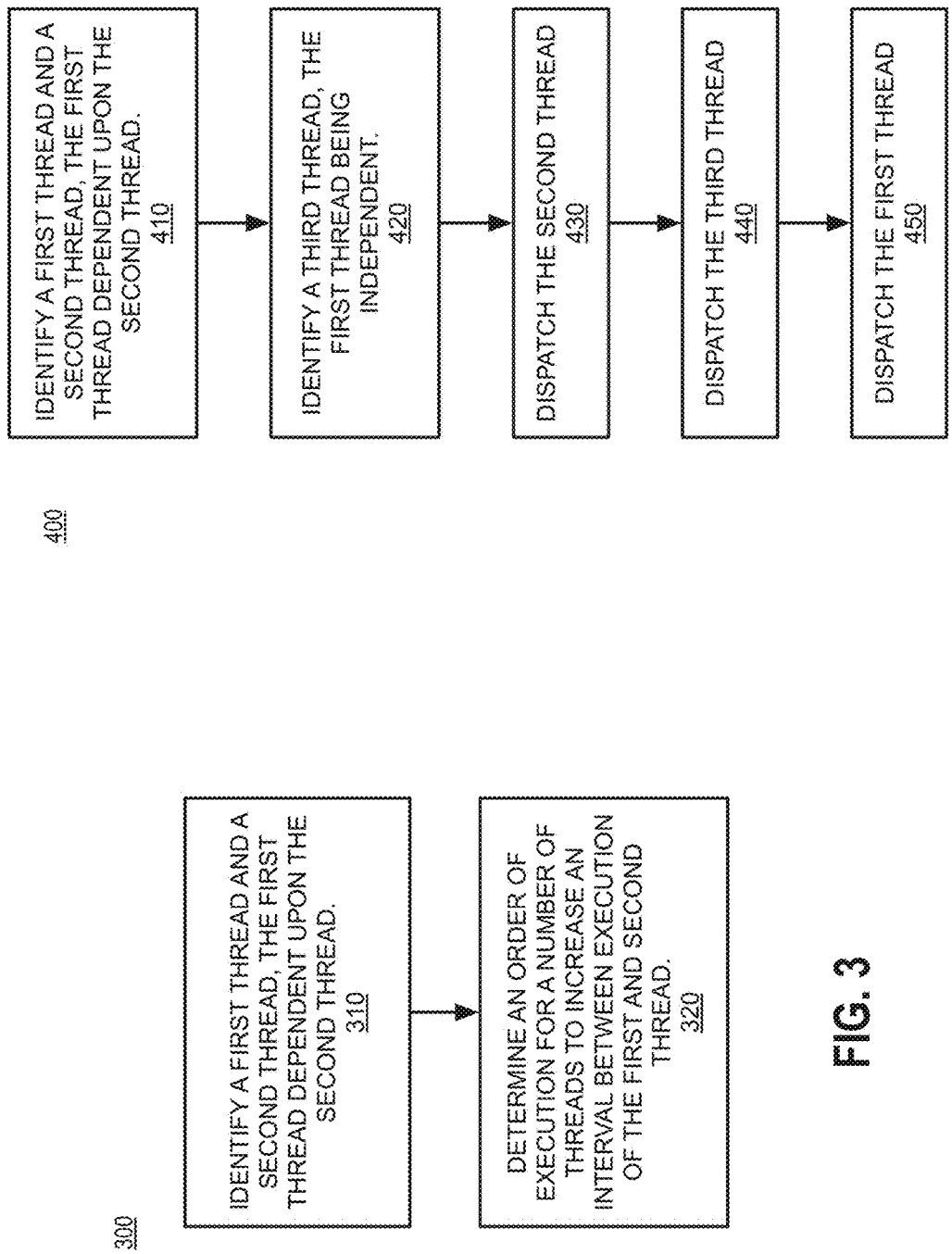

FIG. 6

|  | ASSOCIATED THREAD 758-5 (0, -1) | ASSOCIATED THREAD 758-6 (1, -1) |
|---|---|---|
| ASSOCIATED THREAD 758-4 (-1, -1) | DEPENDENT THREAD 756 (0, 0) | ASSOCIATED THREAD 758-7 (1, 0) |
| ASSOCIATED THREAD 758-3 (-1, 0) | ASSOCIATED THREAD 758-2 (-2, 0) | |
| ASSOCIATED THREAD 758-1 (-1, 1) | | |

FIG. 8B
FIG. 8D
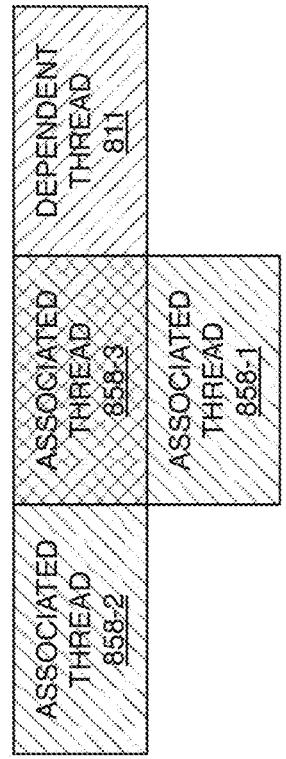
FIG. 8A
FIG. 8C

FIG. 9A
901
- ASSOCIATED THREAD 958-4
- ASSOCIATED THREAD 958-3
- ASSOCIATED THREAD 958-5
- DEPENDENT THREAD 911

FIG. 9B
902
- ASSOCIATED THREAD 958-4
- ASSOCIATED THREAD 958-3
- ASSOCIATED THREAD 958-5
- DEPENDENT THREAD 912
- ASSOCIATED THREAD 958-6

FIG. 9C
903
- ASSOCIATED THREAD 958-4
- ASSOCIATED THREAD 958-3
- ASSOCIATED THREAD 958-5
- DEPENDENT THREAD 913
- ASSOCIATED THREAD 958-6
- ASSOCIATED THREAD 958-7

FIG. 9D
904
- ASSOCIATED THREAD 958-4
- ASSOCIATED THREAD 958-3
- ASSOCIATED THREAD 958-5
- DEPENDENT THREAD 914

| V | H | V | H | V | H | V | H | V | H | V | H | V | H | V | H |
|---|---|---|---|---|---|---|---|---|---|---|---|---|---|---|---|
| 1 | 65 | 9 | 66 | 17 | 67 | 25 | 68 | 33 | 69 | 41 | 70 | 49 | 71 | 57 | 72 |
| 2 | 73 | 10 | 74 | 18 | 75 | 26 | 76 | 34 | 77 | 42 | 78 | 50 | 79 | 58 | 80 |
| 3 | 81 | 11 | 82 | 19 | 83 | 27 | 84 | 35 | 85 | 43 | 86 | 51 | 87 | 59 | 88 |
| 4 | 89 | 12 | 90 | 20 | 91 | 28 | 92 | 36 | 93 | 44 | 94 | 52 | 95 | 60 | 96 |
| 5 | 97 | 13 | 98 | 21 | 99 | 29 | 100 | 37 | 101 | 45 | 102 | 53 | 103 | 61 | 104 |
| 6 | 105 | 14 | 106 | 22 | 107 | 30 | 108 | 38 | 109 | 46 | 110 | 54 | 111 | 62 | 112 |
| 7 | 113 | 15 | 114 | 23 | 115 | 31 | 116 | 39 | 117 | 47 | 118 | 55 | 119 | 63 | 120 |
| 8 | 121 | 16 | 122 | 24 | 123 | 32 | 124 | 40 | 125 | 48 | 126 | 56 | 127 | 64 | 128 |

| V | H | V | H | V | H | V | H | V | H | V | H | V | H |
|---|---|---|---|---|---|---|---|---|---|---|---|---|---|
| 1 | 4 | 10 | 22 | 17 | 32 | 26 | 44 | 37 | 58 | 50 | 72 |
| 3 | 9 | 18 | 33 | 27 | 45 | 38 | 59 | 51 | 73 | 65 | 86 |
| 7 | 16 | 28 | 46 | 39 | 60 | 52 | 74 | 66 | 87 | 80 | 98 |
| 13 | 25 | 40 | 61 | 53 | 75 | 67 | 88 | 81 | 99 | 93 | 108 |
| 21 | 36 | 54 | 76 | 68 | 89 | 82 | 100 | 94 | 109 | 104 | 116 |
| 31 | 49 | 69 | 90 | 83 | 101 | 95 | 110 | 105 | 117 | 113 | 122 |
| 43 | 64 | 84 | 102 | 96 | 111 | 106 | 118 | 114 | 123 | 120 | 126 |
| 57 | 79 | 97 | 112 | 107 | 119 | 115 | 124 | 121 | 127 | 125 | 128 |

```
┌─────────────────────────────┐
│   RECEIVE THREADS FROM      │
│ SUPERBLOCKS IN A WAVEFRONT. │
│            1310             │
└─────────────────────────────┘
              │
              ▼
┌─────────────────────────────┐
│   DISPATCH ALL VERTICAL     │
│  THREADS IN EACH SUPERBLOCK │
│      OF THE WAVEFRONT.      │
│            1320             │
└─────────────────────────────┘
              │
              ▼
┌─────────────────────────────┐
│  DISPATCH ALL HORIZONTAL    │
│  THREADS IN EACH SUPERBLOCK │
│      OF THE WAVEFRONT.      │
│            1330             │
└─────────────────────────────┘
```

FIG. 13

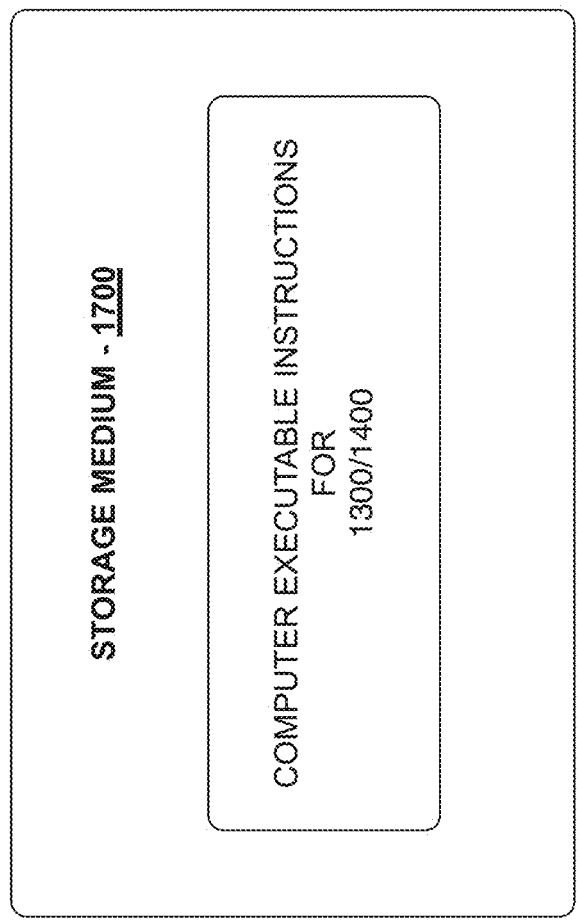

US 10,332,232 B2

THREAD DISPATCHING FOR GRAPHICS PROCESSORS

CROSS-REFERENCE TO RELATED APPLICATION

This application is a continuation of, claims the benefit of and priority to, previously filed U.S. patent application Ser. No. 14/565,240 entitled "THREAD DISPATCHING FOR GRAPHICS PROCESSORS" filed on Dec. 9, 2014, the subject matter of which is hereby incorporated by reference in its entirety.

BACKGROUND

Modern graphic processors include an array of cores, referred to as execution units (EUs) that process instructions. A set of instructions comprises a kernel. Kernels are dispatched to the GPU in the form of multiple threads. The GPU processes the threads of the kernel (e.g., execute the instructions corresponding to the kernel) using the EUs. Often GPU's process the threads in parallel using multiple EUs at once.

Many kernels, particularly kernels corresponding to encoded display data contain dependencies between threads in the kernel. Said differently, execution of some of the threads in the kernel must wait for the threads from which they depend to be executed before their own execution can be started. As such, only a subset of the total number of threads in a kernel can be executed by a GPU in parallel.

Conventionally, a GPU executes a kernel by dispatching those threads without any dependencies first and those with dependencies last. This is sometimes referred to as wavefront dispatching. However, as will be appreciated kernels that have a substantial amount of spatial thread dependency will often experience reduced parallelism when dispatched according to wavefront dispatch methodologies. It is with respect to the above, that the present disclosure is provided.

BRIEF DESCRIPTION OF THE DRAWINGS

FIGS. 3-4 illustrate examples of logic flows for dispatching threads.

FIGS. 6-7 illustrate examples of a graphics kernel according to an embodiment.

FIGS. 8A-8D illustrates tables depicting dependency relationships between the graphics kernel of FIGS. 6-7

FIGS. 9A-9D illustrates tables depicting dependency relationships between the graphics kernel of FIGS. 6-7

FIG. 10 illustrates a table depicting an example dispatch order for the graphics kernel of FIGS. 6-7.

FIG. 11 illustrates a table depicting an example dispatch order for a graphics kernel.

FIGS. 13-14 illustrate examples of logic flows for dispatching threads.

FIG. 17 illustrates a storage medium according to an embodiment.

DETAILED DESCRIPTION

Figure 1:
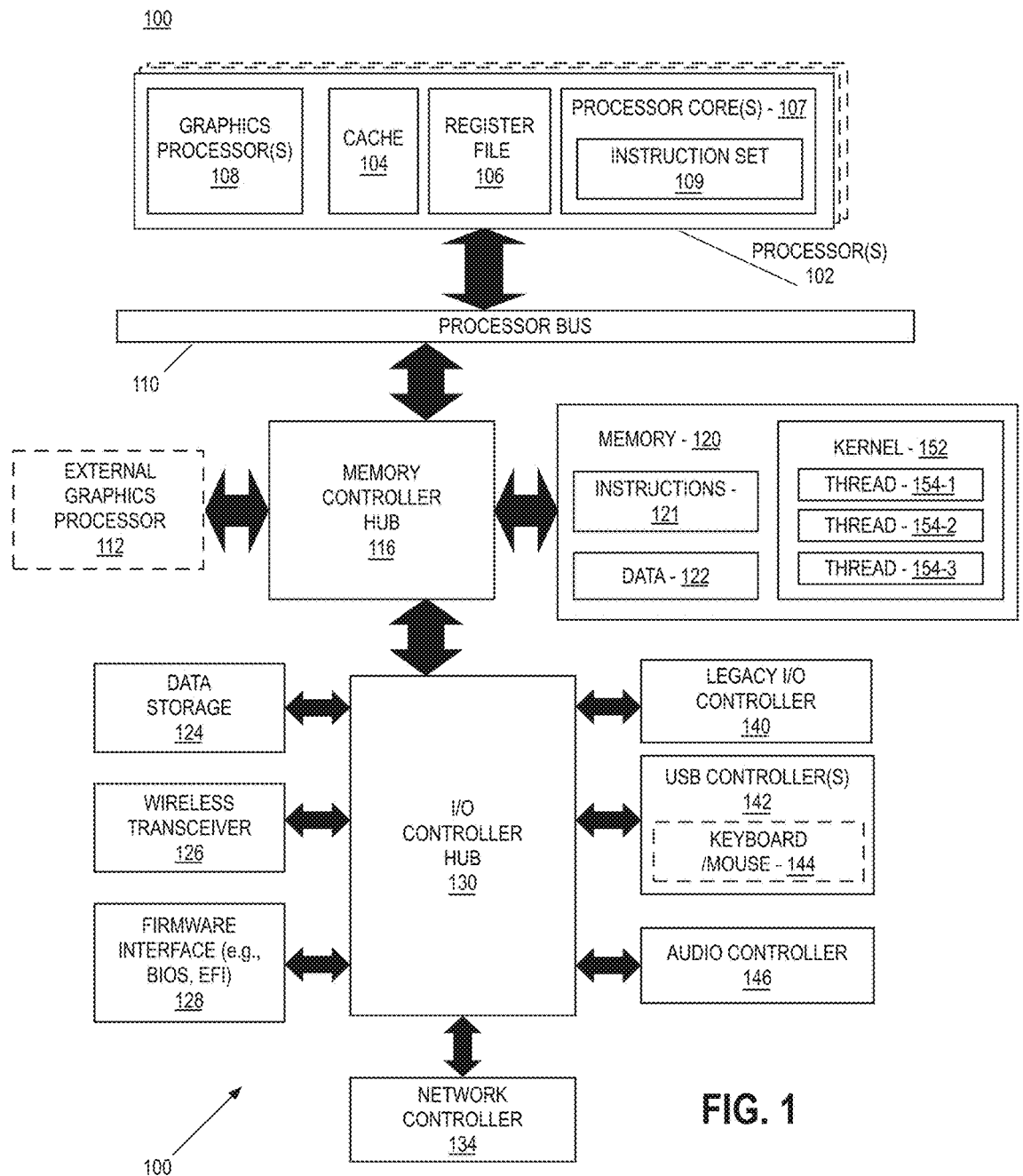
FIG. 1 illustrates an embodiment of a thread dispatch system.

Various embodiments are generally directed to techniques to dispatch threads of a graphics kernel for execution. More specifically, the present disclosure provides for dispatching threads of a graphics kernel to increase the interval between dependent threads and the associated (e.g., threads upon which execution depends) threads. As such, the present disclosure may dispatch threads to reduce the computing penalty (e.g., reduced parallelism, or the like) caused by waiting for associated threads to finish execution before dependent threads can start execution using the associated threads' results.

In some implementations, the dispatch interval may be increased by dispatching associated threads (e.g., those threads upon which other threads execution depends), followed by threads without any dependencies, followed by threads dependent on the earlier dispatched associated threads. As such, the interval between dependent threads and their associated threads can be increased, leading to increased parallelism.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of a thread dispatch system 100, according to an embodiment. In general, the system 100 is configured to optimize the dispatch of threads for execution by a graphics processor. In particular, the system 100 is configured to dispatch the threads to increase the interval between execution of associated threads and corresponding dependent threads. The thread dispatch system 100 includes one or more processors 102 and one or more graphics processors 108, and may be a single processor desktop system, a multiprocessor workstation system, or a server system having a large number of processors 102 or processor cores 107. In on embodiment, the thread dispatch system 100 is a system on a chip integrated circuit (SOC) for use in mobile, handheld, or embedded devices.

An embodiment of the thread dispatch system 100 can include, or be incorporated within a server-based gaming platform, a game console, including a game and media console, a mobile gaming console, a handheld game console, or an online game console. In one embodiment, the thread dispatch system 100 is a mobile phone, smart phone, tablet computing device or mobile Internet device. The thread dispatch system 100 can also include, couple with, or be integrated within a wearable device, such as a smart watch wearable device, smart eyewear device, augmented reality device, or virtual reality device. In one embodiment, the thread dispatch system 100 is a television or set top box device having one or more processors 102 and a graphical interface generated by one or more graphics processors 108.

The one or more processors 102 each include one or more processor cores 107 to process instructions which, when executed, perform operations for system and user software. In one embodiment, each of the one or more processor cores 107 is configured to process a specific instruction set 109. The instruction set 109 may facilitate complex instruction set computing (CISC), reduced instruction set computing (RISC), or computing via a very long instruction word (VLIW). Multiple processor cores 107 may each process a different instruction set 109 that may include instructions to facilitate the emulation of other instruction sets. A processor core 107 may also include other processing devices, such a digital signal processor (DSP).

In one embodiment, the processor 102 includes cache memory 104. Depending on the architecture, the processor 102 can have a single internal cache or multiple levels of internal cache. In one embodiment, the cache memory is shared among various components of the processor 102. In one embodiment, the processor 102 also uses an external cache (e.g., a Level 3 (L3) cache or last level cache (LLC)) (not shown) that may be shared among the processor cores 107 using known cache coherency techniques. A register file 106 is additionally included in the processor 102 which may include different types of registers for storing different types of data (e.g., integer registers, floating point registers, status registers, and an instruction pointer register). Some registers may be general-purpose registers, while other registers may be specific to the design of the processor 102.

The processor 102 is coupled to a processor bus 110 to transmit data signals between the processor 102 and other components in the system 100. The system 100 uses an exemplary 'hub' system architecture, including a memory controller hub 116 and an input output (I/O) controller hub 130. The memory controller hub 116 facilitates communication between a memory device and other components of the system 100, while the I/O controller hub (ICH) 130 provides connections to I/O devices via a local I/O bus.

The memory device 120, can be a dynamic random access memory (DRAM) device, a static random access memory (SRAM) device, flash memory device, or some other memory device having suitable performance to serve as process memory. The memory controller hub 116 also couples with an optional external graphics processor 112, which may communicate with the one or more graphics processors 108 in the processors 102 to perform graphics and media operations. The memory 120 can store data 122 and instructions 121 for use when the processor 102 executes a process. The instructions 121 can be a sequence of instructions operative on the processors 102 and/or the external graphics processor 112 to implement logic to perform various functions.

The ICH 130 enables peripherals to connect to the memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to the ICH 130. In one embodiment, a high-performance network controller (not shown) couples to the processor bus 110.

In various embodiments, the memory 120 stores (e.g., as data 122) one or more of a kernel 152 including threads 154-a. It is important to note, that the kernel 152 can include any number of threads. For example, the kernel 152 is depicted in this figure as including the threads 154-1, 154-2, and 154-3. However, it is to be appreciated, that in practice the kernel 152 may include many more threads than depicted. Examples are not intended to be limiting in this context.

In general, the system 100 dispatches the threads 154-a to increase an interval between execution of dependent threads and associated threads. As used herein, a dependent thread is a thread that depends upon, or consumes results of, another thread. The thread whose results the dependent thread consumes is referred to herein as the associated thread. A dependent thread may have multiple associated threads. Said differently, a dependent thread may consume results from multiple threads. For example, in some common graphics encoding standards, a thread may depend upon the results of 7 other threads. However, it is to be appreciated, that some threads do not have any dependency. More particularly, they are not dependent thread or associated threads. As used herein, such threads are referred to as independent.

For example, assume that the thread 154-1 depends upon the thread 154-2, while the thread 154-3 is independent. As such, the thread 154-1 is dependent while the thread 154-2 is its associated thread. The system 100 can dispatch the threads 154-1, 154-2, and 154-3 to increase the interval between the threads 154-1 and 154-2. As such, in some examples, the system 100 can dispatch the thread 154-2 for execution (e.g., by the graphics processor 108 and/or 112). Subsequently, the system 100 can dispatch the thread 154-3 for execution. Subsequently, the system 100 can dispatch the thread 154-1 for execution. As such, the interval between execution of the dependent thread (e.g., 154-1) and its associated thread (e.g., 154-2) is increased.

In some examples, the processor 102 may determine the order to dispatch the threads 154-a (e.g., the execution order). More particularly, the processor may execution instructions (e.g., instruction set 109) to determine the order in which the threads are to be dispatched (the "dispatch order"). With some examples, the graphics processor (e.g., the graphics processor 108 and/or 112) may determine the dispatch order.

Figure 2:
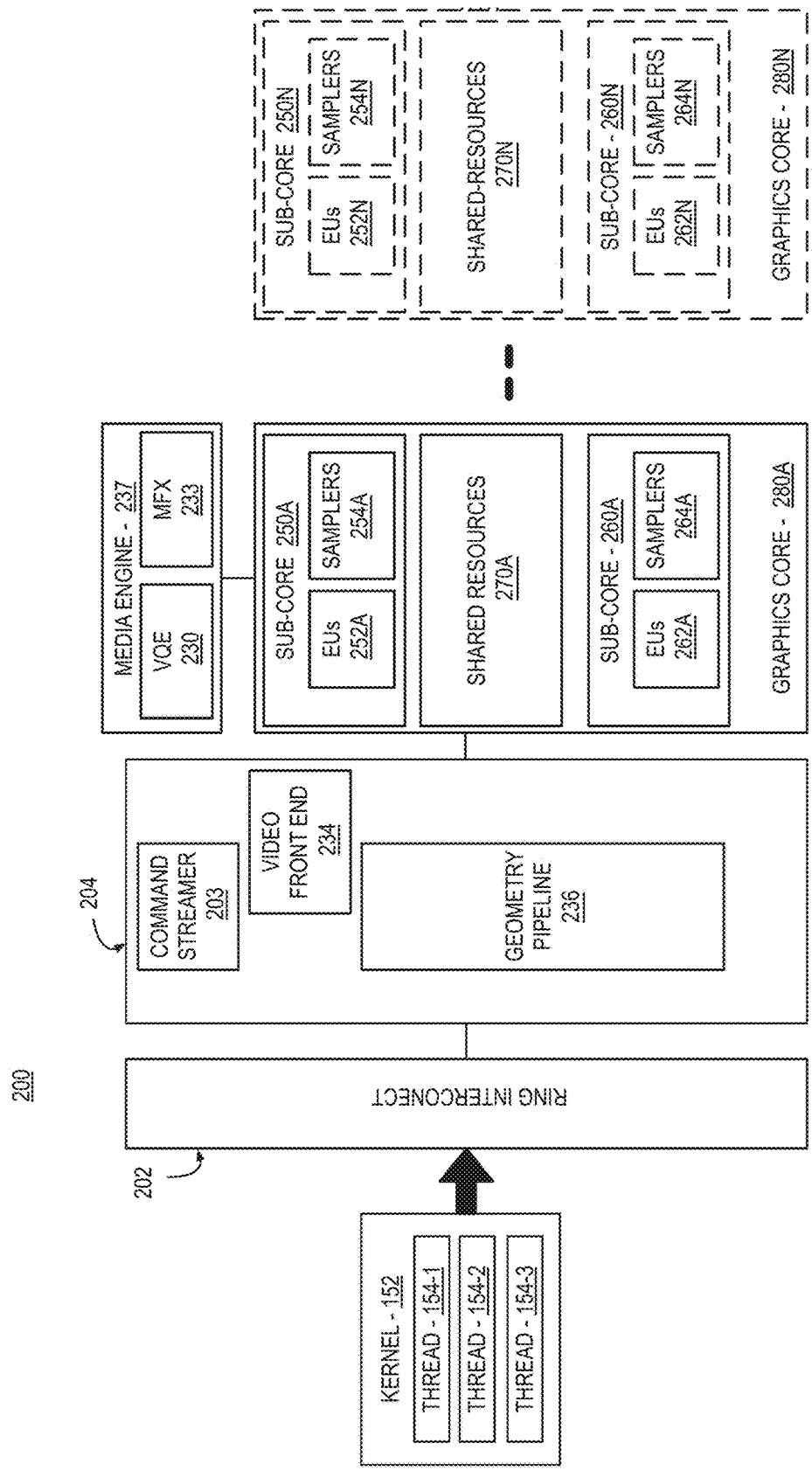
FIG. 2 illustrates an embodiment of a graphics processor that may be implemented in the system of FIG. 1.

FIG. 2 is a block diagram of an embodiment of a graphics processor 200. In some examples, the graphics processor 200 may be the graphics processor 108 and/or the graphics processor 112 of the system 100 shown in FIG. 1. In general, the graphics processor 200 may be configured to execute threads to increase an interval between execution of dependent and associated threads.

In one embodiment, the graphics processor includes a ring interconnect 202, a pipeline front-end 204, a media engine 237, and graphics cores 280A-N. The ring interconnect 202 couples the graphics processor to other processing units, including other graphics processors or one or more general-purpose processor cores. In one embodiment, the graphics processor is one of many processors integrated within a multi-core processing system.

The graphics processor receives batches of commands via the ring interconnect 202. The incoming commands are interpreted by a command streamer 203 in the pipeline front-end 204. For example, the ring interconnect 202 can receive the kernel 152 and threads 154-a. The graphics processor includes scalable execution logic to perform 3D geometry processing and media processing via the graphics core(s) 280A-N. For 3D geometry processing commands, the command streamer 203 supplies the commands to the geometry pipeline 236. For at least some media processing commands, the command streamer 203 supplies the commands to a video front end 234, which couples with a media engine 237. The media engine 237 includes a video quality engine (VQE) 230 for video and image post processing and a multi-format encode/decode (MFX) 233 engine to provide hardware-accelerated media data encode and decode. The geometry pipeline 236 and media engine 237 each generate execution threads for the thread execution resources provided by at least one graphics core 280A.

The graphics processor includes scalable thread execution resources featuring modular cores 280A-N (sometime referred to as core slices), each having multiple sub-cores 250A-N, 260A-N (sometimes referred to as core sub-slices). The graphics processor can have any number of graphics cores 280A through 280N. In one embodiment, the graphics processor includes a graphics core 280A having at least a first sub-core 250A and a second core sub-core 260A. In another embodiment, the graphics processor is a low power processor with a single sub-core (e.g., 250A). In one embodiment, the graphics processor includes multiple graphics cores 280A-N, each including a set of first sub-cores 250A-N and a set of second sub-cores 260A-N. Each sub-core in the set of first sub-cores 250A-N includes at least a first set of execution units 252A-N and media/texture samplers 254A-N. Each sub-core in the set of second sub-cores 260A-N includes at least a second set of execution units 262A-N and samplers 264A-N. In one embodiment, each sub-core 250A-N, 260A-N shares a set of shared resources 270A-N. In one embodiment, the shared resources include shared cache memory and pixel operation logic. Other shared resources may also be included in the various embodiments of the graphics processor.

FIGS. 3-4 illustrate embodiments of logic flows that may be implemented to increase the interval between execution of associated threads and a dependent thread. The logic flows may be representative of some or all of the operations executed by one or more embodiments described herein. In some examples, the logic flows may be executed by components of the system 100. More specifically, the logic flows may illustrate operations performed by the processor 102 in dispatching the threads 154-*a* to the graphics processor 200. Additionally, or alternatively, the logic flows may illustrate operations performed by the graphics processor 200 in executing the threads 154-*a* to increase an interval between dependent and associated threads.

Although reference to the system 100 and component of the system 100 are made in describing the logic flows, the logic flows may be implemented using component other than those shown or component in alternative configuration. Examples are not limited in this context.

Turning more specifically to FIG. 3, a logic flow 300 is depicted. The logic flow 300 may begin at block 310. At block 310 "identify a first thread and a second thread, the first thread dependent upon the second thread," a first thread (e.g., dependent thread) and a second thread (e.g., associated thread) from a number of threads are identified. For example, assuming the thread 154-1 was dependent upon the thread 154-2, the threads 154-1 and 154-2 may be identified. In some examples, the processor 102 may identify the threads 154-1 and 154-2 from the threads 154-*a*. In some examples, the graphics processor 200 may identify the threads 154-1 and 154-2 from the threads 154-*a*.

Continuing to block 320 "determine an order of execution for a number of threads to increase an interval between execution of the first and second threads," an order of execution or dispatch order for the threads 154-*a* may be determined in order to increase the interval between execution of the thread 154-2 and 154-1. In some examples, the processor 102 may determine the dispatch order. With some examples, the graphics processor 200 may determine the dispatch order.

Turning more specifically to FIG. 4, a logic flow 400 is depicted. The logic flow 400 may begin at block 410. At block 410 "identify a first thread and a second thread, the first thread dependent upon the second thread," a first thread (e.g., dependent thread) and a second thread (e.g., associated thread) from a number of threads are identified. For example, assuming the thread 154-1 was dependent upon the thread 154-2, the threads 154-1 and 154-2 may be identified. In some examples, the processor 102 may identify the threads 154-1 and 154-2 from the threads 154-*a*. In some examples, the graphics processor 200 may identify the threads 154-1 and 154-2 from the threads 154-*a*.

Continuing to block 420 "identify a third thread independent thread," a third thread that is independent is identified from the number of threads. For example, assuming the thread 154-3 is independent, the thread 154-3 may be identified. In some examples, the processor 102 may identify the threads 154-1 and 154-2 from the threads 154-*a*. In some examples, the graphics processor 200 may identify the threads 154-1 and 154-2 from the threads 154-*a*.

Continuing to blocks 430-450, the threads may be dispatched in a particular order to increase an interval between execution of the dependent and associated threads. In particular, at block 430 "dispatch the second thread" the second thread is dispatched for execution before either the first or third threads. For example, using the threads 154-1, 154-2, and 154-3 as laid out above, the second thread 154-2 can be dispatched for execution before the threads first and third threads 154-1 and 154-3. In some examples, the processor 102 may dispatch the thread 154-2. In some examples, the graphics processor 200 may dispatch the thread 154-2.

At block 440 "dispatch the third thread" the third thread is dispatched for execution before the first thread. For example, using the threads 154-1, 154-2, and 154-3 as laid out above, the third thread 154-3 can be dispatched for execution before the first thread 154-1. In some examples, the processor 102 may dispatch the thread 154-3. In some examples, the graphics processor 200 may dispatch the thread 154-3.

At block 450 "dispatch the first thread" the first thread is dispatched for execution. For example, using the threads 154-1, 154-2, and 154-3 as laid out above, the first thread 154-1 can be dispatched for execution. As such, the interval between execution of the first thread 154-1 (dependent thread) and the second thread 154-2 (associated thread) is increased. In some examples, the processor 102 may dispatch the thread 154-1. In some examples, the graphics processor 200 may dispatch the thread 154-1.

Figure 5:
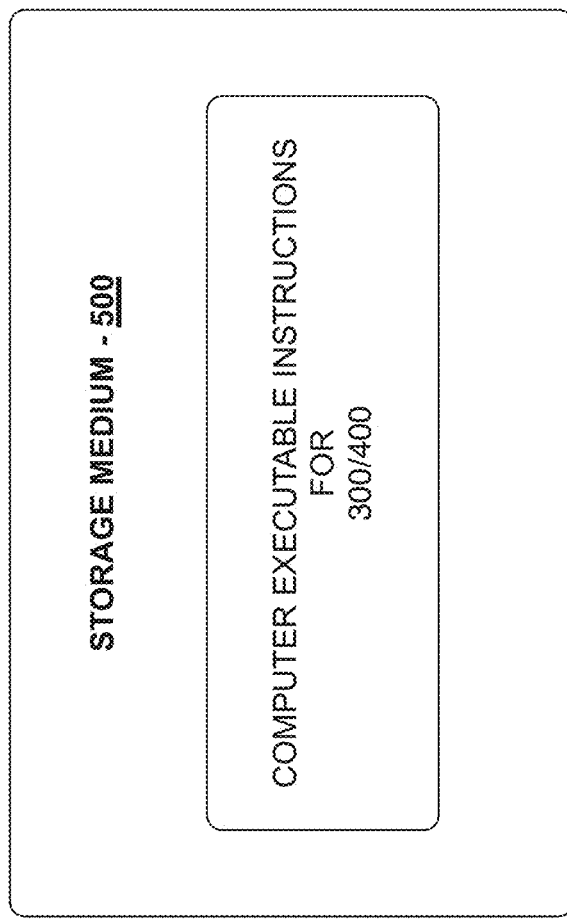
FIG. 5 illustrates a storage medium according to an embodiment.

FIG. 5 illustrates an embodiment of a storage medium 500. The storage medium 500 may comprise an article of manufacture. In some examples, the storage medium 500 may include any non-transitory computer readable medium or machine readable medium, such as an optical, magnetic or semiconductor storage. The storage medium 500 may store various types of computer executable instructions, such as instructions to implement logic flows 300 and/or 400. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

In various examples, the system 100 and the logic flows 300 and 400 may be implemented to dispatch threads from a graphics kernel (e.g., the kernel 152) to increase an interval between execution of a dependent thread and its associated threads. In general, the kernel can be encoded based on any of a variety of graphics encoding standards. For example, the kernel 152 can be encoded using any one of the following graphics encoding standards: WMV, MPEG-4, H.264/MPEG-4, VC1, VP8, VP9, and HEVC.

Figure 6:
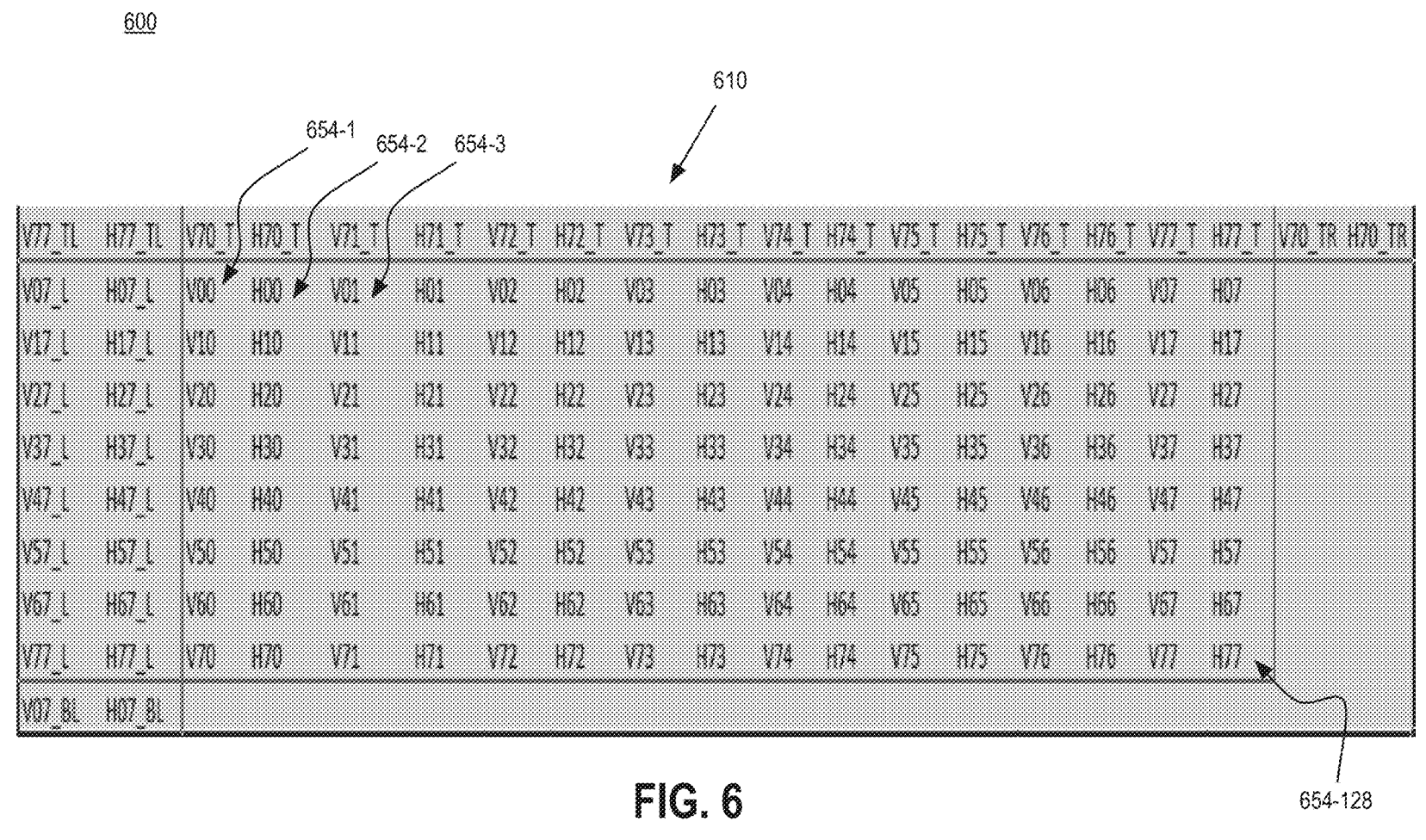

As a specific example, the present disclosure can be applied to dispatch threads from a kernel encoded using the VP9 standard, and particularly, to dispatch threads using a VP9 Deblock GPU approach. In general, FIGS. 6-8 illustrate threads of a VP9 encoded graphics kernel and corresponding dispatch order that can be generated based on the present disclosure. In particular, FIG. 6 is a table illustrating a superblock (e.g., 64×64 pixels) of the VP9 kernel; FIG. 7 is a table illustrating dependency relationships for the threads in the superblock; FIGS. 8A-8D and 9A-9D are tables illustrating dependency relationships for various threads; FIG. 10 is a table illustrating a dispatch order for the threads of the superblock, dispatched according to embodiments of the present disclosure; and FIG. 11 is a table illustrating a dispatch order for the threads of the superblock, dispatched according to a conventional technique.

Turning more specifically to FIG. 6, the table 600 is shown. It is to be appreciated, that the threads of a graphics kernel (e.g., the threads 154-a of the graphics kernel 152) are split into multiple superblocks (e.g., see FIG. 9). For example, the graphics kernel can be split into superblocks of 128 threads that cover a 64×64 pixel area. In particular, the table 600 shows threads 654-1 to 654-128 from a superblock 610. It is important to note, that not all the threads are called out with numeric identifiers in FIG. 6 for purposes of clarity. However, as can be seen the 128 threads 654-1 to 654-128 are formed by interleaving 64 vertical edge threads from an 8×8 pixel space and 64 horizontal edge threads from an 8×8 pixel space into the threadspace of the superblock 610. It is to be appreciated, that the threads are mapped as depicted to have enough parallel software threads for processing.

Turning more specifically to FIG. 7, the table 700 is shown. It is to be appreciated, that a dependent thread in a VP9 encoded graphics kernels can have up to 7 associated threads. Table 700 depicts the dependency for a particular thread based on the VP9 standard. In particular, table 700 shows a dependent thread 756 and associated threads 758-1 to 758-7. As can be seen, for a dependent thread 756, with coordinates (0,0), the associated threads' coordinates in relation to the dependent thread 756 can be: associated thread 758-1 having coordinates (−1, 1); associated thread 758-2 having coordinates (−2, 0); associated thread 758-3 having coordinates (−1, 0); associated thread 758-4 having coordinates (−1, −1); associated thread 758-5 having coordinates (0, −1); associated thread 758-6 having coordinates (1, −1); and associated thread 758-7 having coordinates (1, 0).

Depending on the specific dependent thread's location, only some of the 7 associated threads need to be enforced. Said differently, the output of some of the associated threads may not be required to process the dependent thread. This concept can be reflected in a dependency ranking that includes an indication of the likelihood the dependency will not need to be enforced. In particular, the likelihood that each dependency relationship (e.g., between the dependent thread 756 and each associated thread 758) can be measured. In some examples, this measurement is binary (e.g., 0=yes likely, 1=no not likely, or the like). Said differently, some of the dependency relationships can be considered "weak" while the other are considered "strong." With run time data (i.e., transform size, tile boundary, picture boundary, or the like), the "weak" dependencies may not need to be enforced.

For example, FIGS. 8A-8D illustrate tables 801, 802, 803, and 804, respectively. These tables depict location specific dependency patterns for vertical threads 654 in the superblock 610. FIGS. 9A-9D illustrate tables 901, 902, 903, and 904, respectively. These tables depict location specific dependency patterns for horizontal threads in the superblock 610. It is important to note, that these tables refer to various dependent threads and corresponding associated threads. In particular, the associated threads are referenced based on the table 700 shown in FIG. 7. More specifically, similar numeric identifiers for the associated threads are used in these tables such that referencing the table 700 can identify the relative location of the associated thread to the dependent thread.

Furthermore, these tables highlight associated thread where a dependency ranking including an indication of the likelihood the dependency will need to be enforced during runtime. More specifically, these tables indicate some threads where the dependency may not need to be enforced. In some examples, if there exists a 50% or greater chance that the dependency on an associated thread will not be necessary and can be cleared (e.g., not enforced at runtime) there is a greater priority to increase the interval between execution of the other associated thread and the dependent thread first. As such, the present disclosure provides for determining a dependency ranking and dispatching the associated threads based on the dependent ranking. In particular, the associated threads are dispatched to increase the interval of execution between associated threads that are likely to need to be enforced and the dependent thread to a greater interval than the interval between the associated threads that are unlikely to need to be enforced.

Turning more particularly to FIG. 8A, the table 801 is shown. The table 801 depicts a dependent thread 811 and corresponding associated threads 858-a. It is important to note that the table 801 depicts a dependency pattern for a vertical edge thread where the coordinates are [y>7, x=0]. As depicted the dependent thread 811 has three associated threads 858-a. In particular, the threads 858-1, 858-2, and 858-3 are associated with the dependent thread 811.

Turning more particularly to FIG. 8B, the table 802 is shown. The table 802 depicts a dependent thread 812 and corresponding associated threads 858-a. It is important to note that the table 802 depicts a dependency pattern for a vertical edge thread where the coordinates are [y=7, x=0]. As depicted the dependent thread 812 has three associated threads 858-a. In particular, the threads 858-1, 858-2, and 858-3 are associated with the dependent thread 812.

It is important to note, that for the dependency patterns depicted in tables 801 and 802, the dependency of the associated thread 858-2 is guaranteed by the associated thread 858-2.

Turning more particularly to FIG. 8C, the table 803 is shown. The table 803 depicts a dependent thread 813 and corresponding associated threads 858-a. It is important to note that the table 803 depicts a dependency pattern for a vertical edge thread where the coordinates are [y<7, x>0]. As depicted the dependent thread 813 has two associated threads 858-a. In particular, the threads 858-2 and 858-3 are associated with the dependent thread 813.

Turning more particularly to FIG. 8D, the table 804 is shown. The table 804 depicts a dependent thread 814 and corresponding associated threads 858-a. It is important to note that the table 804 depicts a dependency pattern for a vertical edge thread where the coordinates are [y=7, x>0]. As depicted the dependent thread 814 has two associated threads 858-a. In particular, the threads 858-2 and 858-3 are associated with the dependent thread 814.

With respect to the vertical edge threads depicted in tables 801, 802, 803, and 804, the dependency of each thread upon the associated thread 858-3 is "weak." More specifically, the dependency of each dependent thread upon the associated thread 858-3 can be ranked as likely to not be enforced during runtime. As such, a dependency ranking may be determined (e.g., low, weak, unlikely, 0, 1, or the like) to include an indication that the dependency upon the associated thread 858-3 may not need to be enforced. Furthermore, it is important to note, that the associated threads depicted in tables 801 and 802 cross superblocks and as such, may be a special case.

Turning more particularly to FIG. 9A, the table 901 is shown. The table 901 depicts a dependent thread 911 and corresponding associated threads 958-a. It is important to note that the table 901 depicts a dependency pattern for a horizontal edge thread where the coordinates are [y=7, x<0]. As depicted the dependent thread 911 has five associated threads 958-a. In particular, the threads 958-3, 958-4, 958-5, 958-6, and 958-7 are associated with the dependent thread 911.

Turning more particularly to FIG. 9B, the table 902 is shown. The table 902 depicts a dependent thread 912 and corresponding associated threads 958-a. It is important to note that the table 902 depicts a dependency pattern for a horizontal edge thread where the coordinates are [y=0, x=7]. As depicted the dependent thread 912 has four associated threads 958-a. In particular, the threads 958-3, 958-4, 958-5 and 958-6 are associated with the dependent thread 912.

Turning more particularly to FIG. 9C, the table 903 is shown. The table 903 depicts a dependent thread 913 and corresponding associated threads 958-a. It is important to note that the table 903 depicts a dependency pattern for a horizontal edge thread where the coordinates are [y>0, x<0]. As depicted the dependent thread 913 has five associated threads 958-a. In particular, the threads 958-3, 958-4, 958-5, 958-6, and 958-7 are associated with the dependent thread 913.

Turning more particularly to FIG. 9D, the table 904 is shown. The table 904 depicts a dependent thread 914 and corresponding associated threads 958-a. It is important to note that the table 904 depicts a dependency pattern for a horizontal edge thread where the coordinates are [y>7, x=7]. As depicted the dependent thread 914 has three associated threads 958-a. In particular, the threads 958-3, 958-4 and 958-5 are associated with the dependent thread 914.

With respect to the horizontal edge threads depicted in tables 901, 902, 903, and 904, the dependency of each thread upon the associated thread 958-5 is "weak." More specifically, the dependency of each dependent thread upon the associated thread 958-5 can be ranked as likely to not be enforced during runtime. As such, a dependency ranking may be determined (e.g., low, weak, unlikely, 0, 1, or the like) to include an indication that the dependency upon the associated thread 958-5 may not need to be enforced. Furthermore, it is important to note, that the associated thread 958-3 depicted in tables 901 and 902 cross superblocks and as such, may be a special case.

Returning to the table 600 shown in FIG. 6, the threads 654-a can be dispatched in a particular order to increase the interval between execution of associated threads (e.g., refer to FIGS. 7, 8A-8D, 9A-9D) and corresponding dependent threads. In particular, the present disclosure provides for dispatching the threads to increase the execution interval based on the dependency ranking (e.g., likelihood the dependency will be enforced). FIG. 10 illustrates a table 1000 that shows dispatch ordering for each of the threads 654 depicted in the table 600. In particular, the dispatch ordering depicted in table 1000 is based on embodiments of the present disclosure. For comparison purposes, FIG. 11 illustrates a table 1100 that shows dispatch ordering for each of the threads 654 depicted in the table 600 based on a conventional (e.g., WAVEFRONT) dispatching method.

An example of increasing the interval between executions of associated threads and their corresponding dependent thread is described with reference to FIGS. 10 and 11. In particular, with reference to the horizontal edge dependent thread 654 at coordinate H[1, 1]. This thread and its dispatch order are indicated in the tables 1000 and 1100. This particular thread has five dependencies. Said differently, this particular thread has five associated threads, four of which are "strong," that is likely to be enforced at runtime and one is "weak," that is unlikely to be enforced at runtime (e.g., refer to FIGS. 7 and 9A-9D). The associated threads that are likely to be enforced at runtime are the vertical edge threads V[1, 1], V[0, 1], V[0, 2], and V[1, 2] while the associated thread that is unlikely to be enforced at runtime is H[0, 2].

The present disclosure provides that the dependent thread H[1, 1] is dispatched $74^{th}$. Its associated threads where the dependency ranking indicates the dependency is likely to be enforced (e.g., >50%, or the like) are dispatched $10^{th}$, $9^{th}$, $17^{th}$ and $18^{th}$, respectively. Its associated thread where the dependency ranking indicates the dependency is unlikely to be enforced at runtime is dispatched $66^{th}$.

Conversely, using a conventional dispatching technique, the dependent thread H[1, 1] is dispatched $15^{th}$. Its associated threads where the dependency ranking indicates the dependency is likely to be enforced (e.g., >50%, or the like) are dispatched $6^{th}$, $2^{th}$, $5^{th}$ and $11^{th}$, respectively. Its associated thread where the dependency ranking indicates the dependency is unlikely to be enforced at runtime is dispatched $8^{th}$.

Accordingly, the present disclosure provides that the associated threads are dispatched significantly sooner providing greater time for the execution of the associated threads to finish as compared to conventional techniques. As a result, memory pressure and parallelism can be increased when the present disclosure is implemented to dispatch threads.

Figures 12, 15:
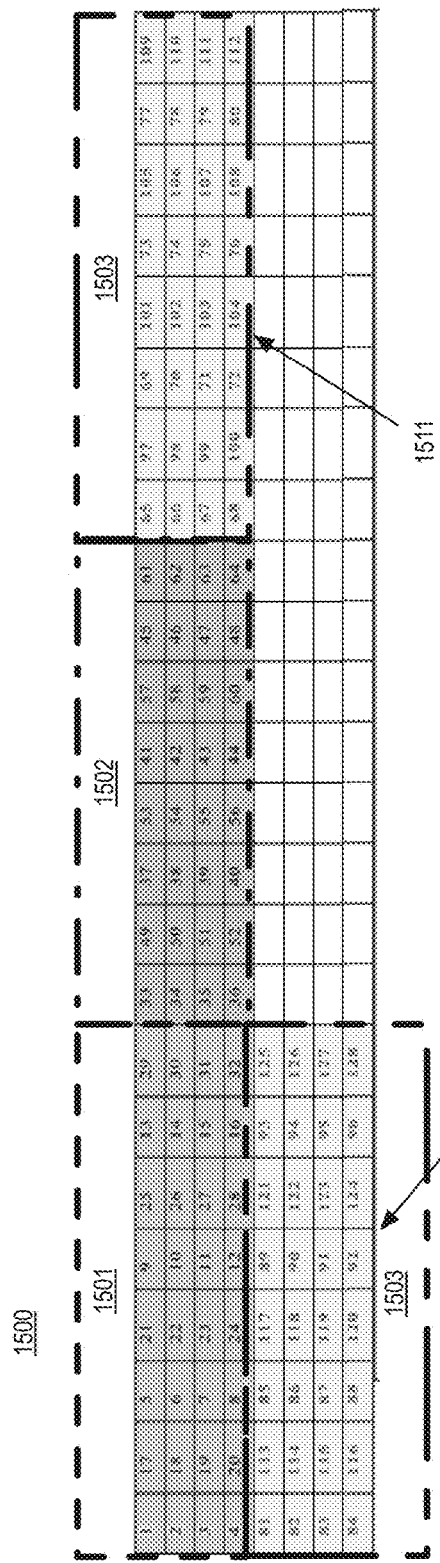
FIG. 12 illustrates a table showing superblocks of a graphics kernel.
FIGS. 15-16 illustrate tables showing threads within waves of superblocks of a graphics kernel.

An actual bit stream (e.g., kernel 152) includes multiple superblocks (e.g., the superblock 610). For example, FIG. 12 illustrates a table 1200 showing multiple superblocks 1201-a, where each superblock includes 128 threads corresponding to a 64×64 pixel area. Each of the superblocks 1201-a are typically dispatched in a 26 degree pattern, as illustrated in this figure. In some examples, all the superblocks 1201-a in the same wavefront (e.g., 1201-3/1201-4, 1201-5/1201-6, 1201-7/1201-8/1201-9, or the like) and can be dispatched together. In some examples, the threads in each superblock may be dispatched individually, for example as illustrated in FIG. 10. With some examples, with each wavefront of superblocks (e.g., 1201-3 and 1201-4) the vertical threads from all the superblocks 1201-a can be dispatched, followed by the horizontal threads. This is illustrated in FIGS. 13-16.

Figure 14:
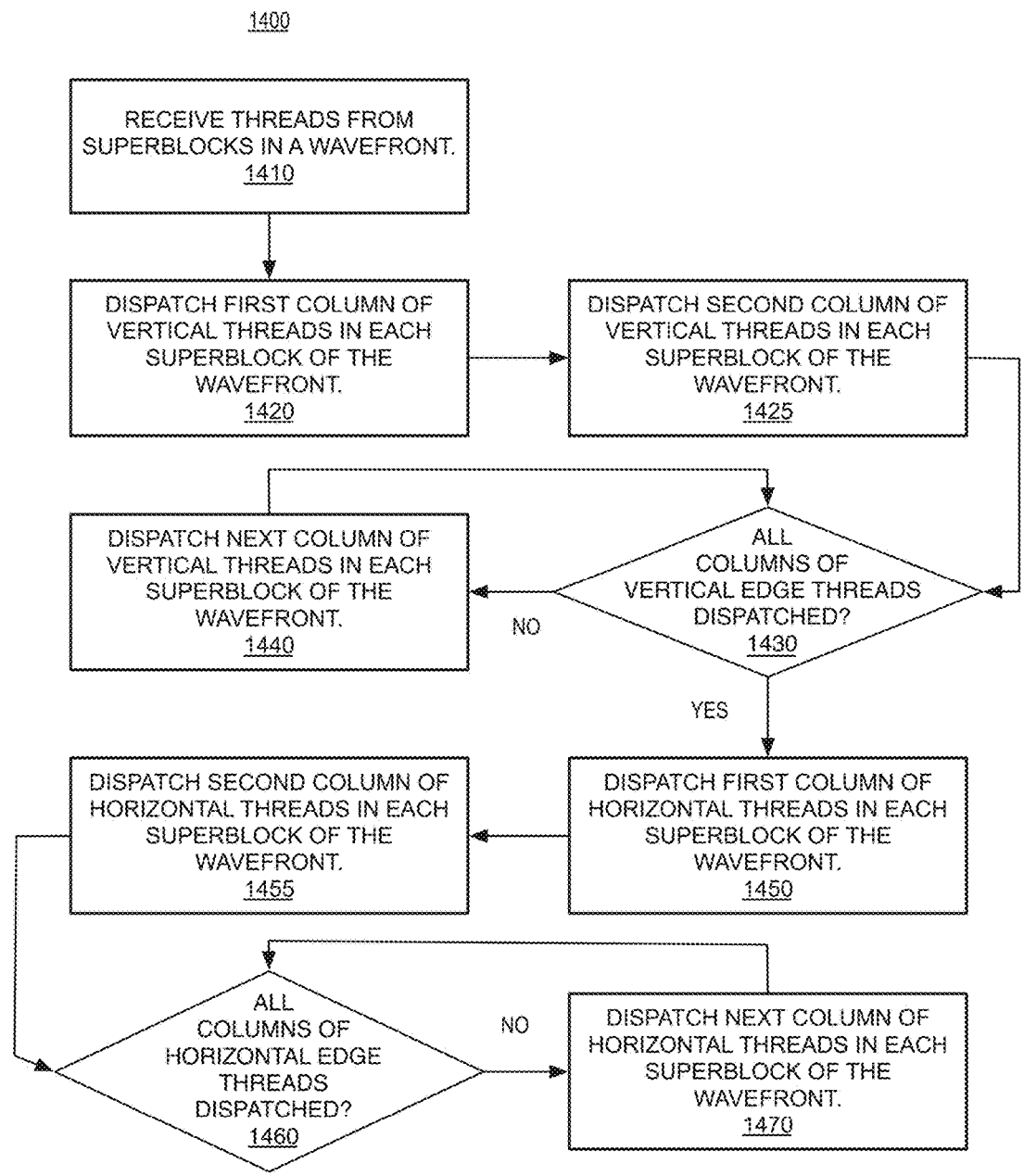
Figure 16:
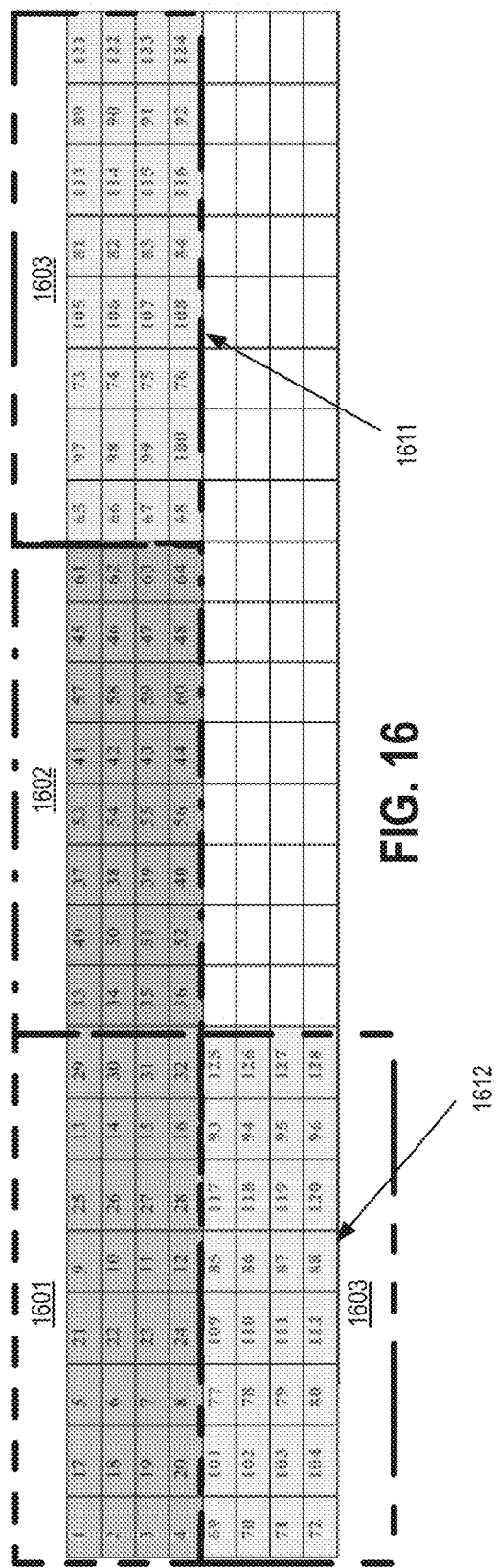

In general, FIGS. 13-14 depict logic flows for dispatching threads within superblocks of a wavefront while FIGS. 15-16 depict tables showing the dispatch order of thread within superblocks of a number of consecutive wavefronts. It is important to note, that the superblocks depicted in FIGS. 15-16 only show 32 threads for purposes of clarity.

Turning more specifically to FIG. 13, the logic flow 1300 is depicted, the logic flow 1300 can be used to increase the interval between execution of associated threads and corresponding dependent threads across multiple superblocks in a wavefront. The logic flow 1300 may begin at block 1310. At block 1310 "receive threads from superblocks in a wavefront" the threads of superblocks (e.g., superblocks 1201-a) for a particular wavefront of superblocks may be received. In some examples, the processor 102 may receive the threads.

Continuing to block 1320 "dispatch all vertical edge threads in each superblock" the columns of vertical threads in each superblock may be dispatched. In some examples, the processor 102 and/or the graphics processor 200 may dispatch the vertical edge threads column by column for each superblock in the wavefront. Continuing to block 1330 "dispatch all horizontal edge threads in each superblock" the columns of horizontal threads in each superblock may be dispatched. In some examples, the processor 102 and/or the graphics processor 200 may dispatch the horizontal edge threads column by column for each superblock in the wavefront.

For example, FIG. 15 illustrates a table 1500 showing three wavefronts of superblocks 1501, 1502, and 1503. As depicted, the third wavefront includes two superblocks 1511 and 1512. Furthermore, as noted, the table 1500 shows the dispatch order for the threads within the superblocks. As can be seen, the columns of vertical edge threads from both superblocks 1511 and 1512 are dispatched prior to the horizontal edge threads being dispatched. In particular, the vertical edge threads from the first superblock are dispatched, followed by the vertical edge threads of the second superblock.

Turning more specifically to FIG. 14, the logic flow 1400 is depicted, the logic flow 1400 can be used to increase the interval between execution of associated threads and corresponding dependent threads across multiple superblocks in a wavefront. The logic flow 1400 may begin at block 1410. At block 1410 "receive threads from superblocks in a wavefront" the threads of superblocks (e.g., superblocks 1201-a) for a particular wavefront of superblocks may be received. In some examples, the processor 102 may receive the threads.

Continuing to block 1420 "dispatch the first column of vertical threads in each superblock" the first column of vertical threads in each superblock may be dispatched. In some examples, the processor 102 and/or the graphics processor 200 may dispatch the first column of vertical edge threads in each superblock in the wavefront. Continuing to block 1425 "dispatch the second column of vertical edge threads in each superblock" the second column of vertical threads in each superblock may be dispatched. In some examples, the processor 102 and/or the graphics processor 200 may dispatch the second column of vertical edge threads in each superblock in the wavefront.

Continuing to block 1430 "all columns of vertical edge threads in each superblock dispatched?" a determination of whether all the columns of vertical edge threads in each superblock have been dispatched is made. In some examples, the processor 102 and/or the graphics processor 200 may determine whether all columns of vertical edge threads in each superblock in the wavefront have been dispatched.

Based on the determination at block 1430 the logic flow 1400 may continue to block 1440 or to block 1450. In particular, if not all columns of vertical edge threads in each superblock have been dispatched, the logic flow may continue to block 1440 "dispatch the next column of vertical edge threads in each superblock" the next column of vertical threads in each superblock may be dispatched. In some examples, the processor 102 and/or the graphics processor 200 may dispatch the next column of vertical edge threads in each superblock in the wavefront.

Alternatively, if all columns of vertical edge threads have been dispatched the logic flow 1400 may continue to block 1450 "dispatch the first column of horizontal edge threads in each superblock" the first column of horizontal edge threads in each superblock may be dispatched. In some examples, the processor 102 and/or the graphics processor 200 may dispatch the first column of horizontal edge threads in each superblock in the wavefront. Continuing to block 1455 "dispatch the second column of horizontal edge threads in each superblock" the second column of horizontal edge threads in each superblock may be dispatched. In some examples, the processor 102 and/or the graphics processor 200 may dispatch the second column of horizontal edge threads in each superblock in the wavefront.

Continuing to block 1460 "all columns of horizontal edge threads in each superblock dispatched?" a determination of whether all the columns of horizontal edge threads in each superblock have been dispatched is made. In some examples, the processor 102 and/or the graphics processor 200 may determine whether all columns of horizontal edge threads in each superblock in the wavefront have been dispatched.

Based on the determination at block 1460 the logic flow 1400 may continue to block 1470 or the logic flow may end. In particular, if not all columns of horizontal edge threads in each superblock have been dispatched, the logic flow may continue to block 1470 "dispatch the next column of horizontal edge threads in each superblock" the next column of horizontal threads in each superblock may be dispatched. In some examples, the processor 102 and/or the graphics processor 200 may dispatch the next column of horizontal edge threads in each superblock in the wavefront.

For example, FIG. 16 illustrates a table 1600 showing three wavefronts of superblocks 1601, 1602, and 1603. As depicted, the third wavefront includes two superblocks 1611 and 1612. Furthermore, as noted, the table 1500 shows the dispatch order for the threads within the superblocks. As can be seen, the first columns of vertical edge threads from both superblocks 1611 and 1612 are dispatched, followed by the second columns of vertical edge threads, etc. After the vertical edge threads are dispatched, the first columns of horizontal edge threads are dispatched, followed by the second columns of vertical edge threads, etc.

FIG. 17 illustrates an embodiment of a storage medium 1700. The storage medium 1700 may comprise an article of manufacture. In some examples, the storage medium 1700 may include any non-transitory computer readable medium or machine readable medium, such as an optical, magnetic or semiconductor storage. The storage medium 1700 may store various types of computer executable instructions, such as instructions to implement logic flows 1300 and/or 1400. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

EXAMPLE 1

An apparatus for dispatching threads for execution by a graphics processing unit (GPU) comprising: a graphics processor configured to execute a plurality of threads; and a thread dispatcher to determine an order of execution of the plurality of threads to increase an interval between execution of a first thread and second thread, the first thread dependent upon the second thread.

EXAMPLE 2

The apparatus of example 1, the thread dispatcher to: identify the first thread and the second thread of the plurality of threads; identify a third thread of the plurality of threads, the third thread independent from the first and second threads; dispatch the second thread for execution by the graphics processor; dispatch the third thread for execution by the graphics processor; and dispatch the first thread for execution by the graphics processor.

EXAMPLE 3

The apparatus of example 1, the thread dispatcher to: identify the first thread; identify a subset of threads, the subset of threads to include the second thread and one or more other ones of the plurality of threads, the first thread dependent upon the threads of the subset of threads; determine, for each thread of the subset of threads, a dependency ranking, the dependency ranking to include an indication of the likelihood the dependency will not need to be enforced;

and determine an order of execution of the threads of the subset of threads based on the dependency ranking.

EXAMPLE 4

The apparatus of example 3, the subset of threads to include a third thread, wherein the dependency ranking of the second and third threads indicates the likelihood the dependency of second thread will not need to be enforced is higher than the likelihood the dependency of the third thread will not need to be enforced; the thread dispatcher to: dispatch the third thread for execution by the graphics processor; dispatch the second thread for execution by the graphics processor; and dispatch the first thread for execution by the graphics processor.

EXAMPLE 5

The apparatus of example 1, the thread dispatcher to determine the order of dispatching based in part upon whether a thread is a vertical edge thread or a horizontal edge thread.

EXAMPLE 6

The apparatus of example 5, the thread dispatcher to: dispatch the threads of the plurality of threads that are vertical edge threads; and dispatch the threads of the plurality of threads that are horizontal edge threads.

EXAMPLE 7

The apparatus of example 5, the thread dispatcher to: dispatch the threads of the plurality of threads in a first column that are vertical edge threads; dispatch the threads of the plurality of threads in the first column that are horizontal edge threads; dispatch the threads of the plurality of threads in a second column that are vertical edge threads; and dispatch the threads of the plurality of threads in the second column that are horizontal edge threads.

EXAMPLE 8

The apparatus of any one of example 1-7, wherein the plurality of threads are threads of a graphics kernel.

EXAMPLE 9

The apparatus of example 7, the graphics kernel encoded based on an encoding standard selected from the group comprising WMV, MPEG-4, H.264/MPEG-4, VC1, VP8, VP9, and HEVC.

EXAMPLE 10

The apparatus of any one of examples 1 to 7, further comprising a display operably coupled to the graphics processing unit to display data processed by the graphics processing unit.

EXAMPLE 11

The apparatus of any one of examples 1 to 7, further comprising a wireless radio operably coupled to the graphics processing unit to receive data to be processed by the graphics processing unit.

EXAMPLE 12

A computing-implemented method comprising: identifying a first thread and a second thread of a plurality of threads to be executed by a graphics processor, the first thread dependent upon the second thread; and determining an order of execution of the plurality of threads to increase an interval between execution of the first thread and the second thread.

EXAMPLE 13

The computing-implemented method of example 12, comprising: identifying a third thread of the plurality of threads, the third thread independent from the first and second threads; dispatching the second thread for execution by the graphics processor; dispatching the third thread for execution by the graphics processor; and dispatching the first thread for execution by the graphics processor.

EXAMPLE 14

The computing-implemented method of example 12, comprising: identifying a subset of threads, the subset of threads to include the second thread and one or more other ones of the plurality of threads, the first thread dependent upon the threads of the subset of threads; determining, for each thread of the subset of threads, a dependency ranking, the dependency ranking to include an indication of the likelihood the dependency will not need to be enforced; and determining an order of execution of the threads of the subset of threads based on the dependency ranking.

EXAMPLE 15

The computing-implemented method of example 14, the subset of threads to include a third thread, wherein the dependency ranking of the second and third threads indicates the likelihood the dependency of second thread will not need to be enforced is higher than the likelihood the dependency of the third thread will not need to be enforced; the method comprising: dispatching the third thread for execution by the graphics processor; dispatching the second thread for execution by the graphics processor; and dispatching the first thread for execution by the graphics processor.

EXAMPLE 16

The computing-implemented method of example 12, comprising determining the order of dispatching based in part upon whether a thread is a vertical edge thread or a horizontal edge thread.

EXAMPLE 17

The computing-implemented method of example 16, comprising: dispatching the threads of the plurality of threads that are vertical edge threads; and dispatching the threads of the plurality of threads that are horizontal edge threads.

EXAMPLE 18

The computing-implemented method of example 16, comprising: dispatching the threads of the plurality of threads in a first column that are vertical edge threads; dispatching the threads of the plurality of threads in the first column that are horizontal edge threads; dispatching the threads of the plurality of threads in a second column that are vertical edge threads; and dispatching the threads of the plurality of threads in the second column that are horizontal edge threads.

EXAMPLE 19

The computing-implemented method of any one of examples 12-18, wherein the plurality of threads are threads of a graphics kernel.

EXAMPLE 20

The computing-implemented method of example 19, the graphics kernel encoded based on an encoding standard selected from the group comprising WMV, MPEG-4, H.264/MPEG-4, VC1, VP8, VP9, and HEVC.

EXAMPLE 21

An apparatus comprising means for performing the method of any of examples 12-20.

EXAMPLE 22

At least one machine-readable storage medium comprising instructions that when executed by a computing device, cause the computing device to: identify a first thread and a second thread of a plurality of threads to be executed by a graphics processor, the first thread dependent upon the second thread; and determine an order of execution of the plurality of threads to increase an interval between execution of the first thread and the second thread.

EXAMPLE 23

The at least one machine-readable storage medium of example 22, comprising instructions that when executed by the computing device, cause the computing device to: identify a third thread of the plurality of threads, the third thread independent from the first and second threads; dispatch the second thread for execution by the graphics processor; dispatch the third thread for execution by the graphics processor; and dispatch the first thread for execution by the graphics processor.

EXAMPLE 24

The at least one machine-readable storage medium of example 22, comprising instructions that when executed by the computing device, cause the computing device to: identify a subset of threads, the subset of threads to include the second thread and one or more other ones of the plurality of threads, the first thread dependent upon the threads of the subset of threads; determine, for each thread of the subset of threads, a dependency ranking, the dependency ranking to include an indication of the likelihood the dependency will not need to be enforced; and determine an order of execution of the threads of the subset of threads based on the dependency ranking.

EXAMPLE 25

The at least one machine-readable storage medium of example 24, the subset of threads to include a third thread, wherein the dependency ranking of the second and third threads indicates the likelihood the dependency of second thread will not need to be enforced is higher than the likelihood the dependency of the third thread will not need to be enforced, comprising instructions that when executed by the computing device, cause the computing device to: dispatch the third thread for execution by the graphics processor; dispatch the second thread for execution by the graphics processor; and dispatch the first thread for execution by the graphics processor.

EXAMPLE 26

The at least one machine-readable storage medium of example 22, comprising instructions that when executed by the computing device, cause the computing device to determine the order of dispatching based in part upon whether a thread is a vertical edge thread or a horizontal edge thread.

EXAMPLE 27

The at least one machine-readable storage medium of example 26, comprising instructions that when executed by the computing device, cause the computing device to: dispatch the threads of the plurality of threads that are vertical edge threads; and dispatch the threads of the plurality of threads that are horizontal edge threads.

EXAMPLE 28

The at least one machine-readable storage medium of example 22, comprising instructions that when executed by the computing device, cause the computing device to: dispatch the threads of the plurality of threads in a first column that are vertical edge threads; dispatch the threads of the plurality of threads in the first column that are horizontal edge threads; dispatch the threads of the plurality of threads in a second column that are vertical edge threads; and dispatch the threads of the plurality of threads in the second column that are horizontal edge threads.

EXAMPLE 29

The at least one machine-readable storage medium of any one of example 22-28, wherein the plurality of threads are threads of a graphics kernel.

EXAMPLE 30

The at least one machine-readable storage medium of example 29, the graphics kernel encoded based on an encoding standard selected from the group comprising WMV, MPEG-4, H.264/MPEG-4, VC1, VP8, VP9, and HEVC

What is claimed is:
1. At least one non-transitory computer-readable storage medium comprising instructions that when executed by a computing device, cause the computing device to:
identify threads for execution by a graphics processor; and
determine an order of execution to increase an interval between execution of the threads based on dependency rankings of the threads, the order of execution to dispatch a first thread for execution, to dispatch a second thread for execution after the first thread; and to dispatch a third thread for execution after the second thread; wherein the third thread is dependent on the first thread; wherein the first thread is associated with the third thread; wherein the second thread is independent of the third thread, the second thread is independent of the first thread, the second thread to execute during an interval between execution of the first thread and the third thread.

2. The at least one non-transitory computer-readable storage medium of claim 1, comprising instructions that when executed by the computing device, cause the computing device to dispatch the first, second, and third thread for execution by the graphics processor.

3. The at least one non-transitory computer-readable storage medium of claim 1, comprising instructions that when executed by the computing device, cause the computing device to:
identify a fourth thread, the fourth thread dependent upon the third thread;
determine, for the fourth thread, a dependency ranking, the dependency ranking to include an indication of the likelihood the dependency will not need to be enforced; and
determine an order of execution of the threads, based on the dependency ranking.

4. The at least one machine-readable storage medium of claim 3, wherein dependency rankings of the third and fourth thread indicate the likelihood the dependency of third thread will not need to be enforced is higher than the likelihood the dependency of the fourth thread will not need to be enforced, comprising instructions that when executed by the computing device, cause the computing device to:
dispatch the first thread for execution by the graphics processor;
dispatch the second thread for execution by the graphics processor;
dispatch the third thread for execution by the graphics processor; and
dispatch the fourth thread for execution by the graphics processor.

5. The at least one non-transitory computer-readable storage medium of claim 1, comprising instructions that when executed by the computing device, cause the computing device to:
determine the order of dispatching based in part upon whether a thread is a vertical edge thread or a horizontal edge thread.

6. The at least one non-transitory computer-readable storage medium of claim 5, comprising instructions that when executed by the computing device, cause the computing device to:
dispatch the threads of the plurality of threads that are vertical edge threads; and
dispatch the threads of the plurality of threads that are horizontal edge threads.

7. The at least one non-transitory computer-readable storage medium of claim 1, comprising instructions that when executed by the computing device, cause the computing device to:
dispatch the threads of the plurality of threads in a first column that are vertical edge threads;
dispatch the threads of the plurality of threads in the first column that are horizontal edge threads;
dispatch the threads of the plurality of threads in a second column that are vertical edge threads; and
dispatch the threads of the plurality of threads in the second column that are horizontal edge threads.

8. A system to dispatch threads for execution comprising:
more than one execution units; and
a processor to dispatch, to the more than one execution units, threads in accordance with an order of execution to increase an interval between execution of the threads based on dependency rankings of the threads, the processor to dispatch a first thread for execution, to dispatch a second thread for execution after the first thread; and to dispatch a third thread for execution after the second thread; wherein the third thread is dependent on the first thread; wherein the first thread is associated with the third thread; wherein the second thread is independent of the third thread, the second thread is independent of the first thread, the second thread to execute during an interval between execution of the first thread and the third thread.

9. The system of claim 8, the processor to dispatch the first, second, and third thread for execution by a graphics core.

10. The system of claim 9, wherein the processor comprises a command streamer in a pipeline front-end to interpret the threads and to supply the threads to a graphics core of the circuitry.

11. The system of claim 9, the processor to:
identify a fourth thread, the fourth thread dependent upon the first thread;
determine, for the fourth thread, a dependency ranking, the dependency ranking to include an indication of the likelihood the dependency will not need to be enforced; and
determine an order of execution of the threads based on the dependency ranking.

12. The system of claim 8, the processor to determine the order of dispatching based in part upon whether a thread is a vertical edge thread or a horizontal edge thread.

13. The system of claim 12, the processor to:
dispatch the threads of the plurality of threads that are vertical edge threads; and dispatch the threads of the plurality of threads that are horizontal edge threads.

14. The system of claim 13, the processor to:
dispatch the threads of the plurality of threads in a first column that are vertical edge threads;
dispatch the threads of the plurality of threads in the first column that are horizontal edge threads;
dispatch the threads of the plurality of threads in a second column that are vertical edge threads; and
dispatch the threads of the plurality of threads in the second column that are horizontal edge threads.

15. The system of claim 8, the kernel encoded based on an encoding standard selected from the group comprising WMV, MPEG-4,H.264/MPEG-4, VC1, VP8, VP9, and HEVC, and further comprising a display operably coupled the processor to display data processed by the more than one execution units and a wireless radio operably coupled to the processor to receive data to be processed by the more than one execution units.

16. An apparatus to dispatch threads for execution comprising:
cache to store threads; and
more than one execution units coupled with the cache to execute the threads in accordance with an order of execution to increase an interval between execution of the threads based on dependency rankings of the threads, the more than one execution units to execute a first thread, to execute a second thread after execution the first thread; and to execute a third thread after execution of the second thread; wherein the third thread is dependent on the first thread; wherein the first thread is associated with the third thread; wherein the second thread is independent of the third thread and the second thread is independent of the first thread.

17. The apparatus of claim 16, further comprising circuitry to dispatch the first, second, and third thread for execution by a graphics core.

18. The apparatus of claim 17, the circuitry to:
identify a fourth thread, the fourth thread dependent upon the first thread;
determine, for the fourth thread, a dependency ranking, the dependency ranking to include an indication of the likelihood the dependency will not need to be enforced; and
determine an order of execution of the threads based on the dependency ranking.

19. The apparatus of claim 17, wherein circuitry comprises a command streamer in a pipeline front-end to interpret the threads and to supply the threads to a graphics core of the circuitry.

* * * * *